(12) United States Patent
Aoki

(10) Patent No.: US 7,714,872 B2
(45) Date of Patent: May 11, 2010

(54) METHOD OF CREATING TEXTURE CAPABLE OF CONTINUOUS MAPPING

(75) Inventor: Sachiyo Aoki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 848 days.

(21) Appl. No.: 11/196,489

(22) Filed: Aug. 3, 2005

(65) Prior Publication Data

US 2006/0077208 A1    Apr. 13, 2006

(30) Foreign Application Priority Data

Oct. 8, 2004    (JP)    ............................. 2004-296840

(51) Int. Cl.
   *G09G 5/00*    (2006.01)
   *G06T 15/20*   (2006.01)
(52) U.S. Cl. .................... 345/582; 345/427; 345/629
(58) Field of Classification Search .................. 345/423
   See application file for complete search history.

(56) References Cited

U.S. PATENT DOCUMENTS

| | | | |
|---|---|---|---|
| 5,179,638 A | | 1/1993 | Dawson et al. |
| 5,369,735 A | * | 11/1994 | Thier et al. .................. 345/423 |
| 5,557,711 A | * | 9/1996 | Malzbender ................ 345/422 |
| 5,579,456 A | * | 11/1996 | Cosman ...................... 345/419 |
| 5,761,401 A | * | 6/1998 | Kobayashi et al. .......... 345/630 |
| 5,810,396 A | | 9/1998 | Kurata et al. |
| 6,121,975 A | | 9/2000 | Mungenast et al. |
| 6,734,854 B1 | * | 5/2004 | Shimizu ...................... 345/422 |
| 7,095,418 B2 | * | 8/2006 | Levene et al. ............... 345/582 |
| 2005/0012757 A1 | * | 1/2005 | Park et al. ................... 345/582 |
| 2005/0017982 A1 | * | 1/2005 | Kane, Jr. ..................... 345/582 |

FOREIGN PATENT DOCUMENTS

| | | |
|---|---|---|
| EP | 0 454 129 | 10/1991 |
| EP | 0 535 987 | 4/1993 |
| EP | 0 769 761 | 4/1997 |

OTHER PUBLICATIONS

European Search Report dated Feb. 27, 2008, from the corresponding European Application.
Michael F. Cohen, et al. "Wang Tiles for Image and texture Generation" ACM Transactions on Graphics, vol. 22, No. 3, 2003, pp. 287-294.

* cited by examiner

*Primary Examiner*—Aaron M Richer
(74) *Attorney, Agent, or Firm*—Katten Muchin Rosenman LLP

(57) ABSTRACT

A method of quickly creating a texture which shows a continuous pattern when mapped repeatedly is provided. A space having three-dimensional objects arranged therein is rendered into a two-dimensional plane, or a rendering area. The rendering area is virtually divided into a plurality of congruent areas. Corresponding pixels of the areas are overlapped with each other to obtain a desired texture. At the time of overlapping, Z values in Z buffers are compared to update color information and Z values of a target area so that the data on pixels closer to a viewpoint shows all the time.

9 Claims, 9 Drawing Sheets

METHOD OF CREATING TEXTURE CAPABLE OF CONTINUOUS MAPPING

BACKGROUND OF THE INVENTION

1. Field of the Invention

The invention relates to a three-dimensional computer graphics technology, and more particularly to a method of creating a texture.

2. Description of the Related Art

In the field of computer graphics (CG) or three-dimensional graphics in particular, a texture mapping technology is used to achieve graphics having higher resemblance to actual live images. In the texture mapping technology, images called textures, which imitate actual matters, are pasted onto the surfaces of objects rendered in simple polygons.

For example, when a game program with three-dimensional graphics display presents cave rocks or human skin, textures containing image data for imitating the physical texture of a rock or skin are mapped onto the surfaces of polygons to generate photorealistic images. Moreover, to express pits and projections on the surfaces of objects, a technique called bump mapping is also used. In this technique, matters are shown as if having uneven surfaces although the three-dimensional models have flat surfaces.

When a certain pattern or asperities need to be repeated on a wide range of the surface of a matter, a unit texture is mapped repeatedly. Here, the boundaries of the unit texture may appear inappropriately noticeable unless the unit texture is created so as to show a continuous pattern across adjoining unit textures.

If a game uses textures that are to be mapped repeatedly to show continuous patterns, the textures may be created in advance at the programming stage. Nevertheless, the textures created previously have a prescribed viewpoint and prescribed positions of light sources alone, and thus are sometimes inappropriate to express desired physical textures. Besides, prepared textures have only a limited capability to express the surfaces of matters when the matters vary in color or roughness with time.

SUMMARY OF THE INVENTION

The present invention has been achieved in view of the foregoing problems. It is thus an object of the present invention to provide a method of quickly creating a texture which can be mapped repeatedly to show a continuous pattern.

In a texture creation method according to one of the aspects of the present invention, one or more three-dimensional objects are arranged in a space, and rendered in a rendering area through hidden surface elimination processing with reference to Z values thereof indicating depths from a viewpoint. This rendering area is divided into a plurality of mutually congruent areas, and the divided areas are merged into a predetermined target rendering area. At the time of merging the divided areas into the target rendering area, pixel data and Z values are updated based on a result of comparison between the Z values of overlapping pixels, whereby the divided areas are merged. The texture created thus shows a three-dimensional continuous pattern when mapped repeatedly.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

Figure 1:
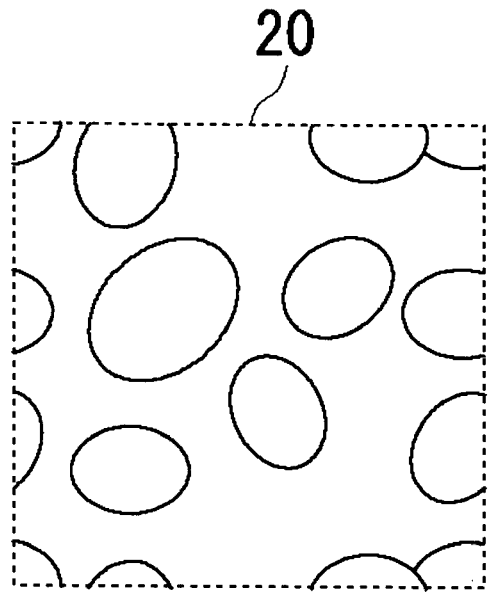
FIG. 1 is a diagram showing a texture created by a texture creation method according to an embodiment.

The invention will now be described based on preferred embodiments which do not intend to limit the scope of the present invention but exemplify the invention. All of the features and the combinations thereof described in the embodiments are not necessarily essential to the invention.

Before going into details of the embodiments, an overview thereof will be given here.

One of the aspects of the present invention relates to a texture creation method. This texture creation method includes the steps of: arranging one or more three-dimensional objects in a space, and rendering the three-dimensional objects in a rendering area through hidden surface elimination processing with reference to Z values thereof indicating depths from a viewpoint; dividing the rendering area into a plurality of mutually congruent areas; and merging the divided areas into a predetermined target rendering area. At the time of merging the divided areas into the predetermined target rendering area, pixel data and Z values are updated based on a result of comparison between the Z values of overlapping pixels, whereby the divided areas are merged into intended texture data.

According to this aspect, a texture capable of being pasted repeatedly can be created efficiently at high speed.

Each of the three-dimensional objects is arranged in the space so that it is included at least in part in the predetermined target rendering area out of the divided areas.

Arranging three-dimensional objects under the foregoing condition ensures that all those arranged are objects to be rendered. This can reduce redundancy and allow still faster texture creation.

In advance of the step of merging the divided areas into the target rendering area, the method may include the step of rendering a background texture in the predetermined target rendering area by using a Z value farther from the viewpoint than the three-dimensional objects.

The background texture may be merely a pattern, a background color, or even a wrap round texture or the like created in advance.

Another aspect of the present invention is a method of creating a texture having height information. In this method, the Z value of each pixel of the texture created by the foregoing texture creation method is converted into information on height from a predetermined reference plane perpendicular to a view direction in the space where the plurality of three-dimensional objects are arranged. The resultant may be stored as inherent height information.

According to this aspect of the exemplary embodiment, a three-dimensional texture having height information can be created easily by simply converting the Z values into height information. Such a three-dimensional texture having height information can be used as a displacement map through arithmetic processing. This makes it possible to express pits and projections on the surfaces of matters more realistically. When the conversion from the Z values into height information involves parallel projection or the like, the three-dimensional texture having height information can be obtained without any special processing since the Z values themselves indicate the height information.

Still another aspect of the present invention is a normal vector map texture creation method. In this normal vector map texture creation method, the direction of a normal vector to each pixel of the texture created by the foregoing texture creation method is calculated and stored based on the Z value or height information of the same.

According to this aspect, it is possible to create a normal vector map texture which can be used as a bump map and is capable of continuous mapping repeatedly.

Still another aspect of the present invention is a unit sheet. This unit sheet has bounding sides, and is created so that corresponding pixels on opposite ones of the sides have the same Z values. When the unit sheet is arranged repeatedly, adjoining ones of the unit sheets thus coincide in the Z values on the boundary therebetween.

The "unit sheet" refers to, in tangible form, a single unit component of such a matter as wallpaper to be put on a wall, and a mat or tiling to pave a floor. In intangible form, the "unit sheet" refers to electronic data on a mold or a printing pattern that is necessary in computer-designing the foregoing wallpaper, tiling, or the like for the sake of actual fabrication, or a graphic pattern or the like that is used by a computer program. In other words, the unit sheet may be created virtually on a computer.

When the unit sheet is tangible, the Z values refer to depth information in the state of the electronic data on a computer before the unit sheet is formed as a tangible form.

The data of such a unit sheet can be created electronically by the foregoing texture creation method.

Incidentally, any combinations of the foregoing components, and the components and expressions of the present invention replaced with methods, apparatuses, systems, and the like mutually are also intended to constitute applicable aspects of the present invention.

Hereinafter, an embodiment of the present invention will be described in detail with reference to the drawings.

FIG. 1 shows a texture 20 to be created by the texture creation method according to the present embodiment. This texture has data which includes both color information for indicating RGB (Red, Green, and Blue) luminances and a Z value for indicating the depth from a viewpoint pixel by pixel.

Figure 2:
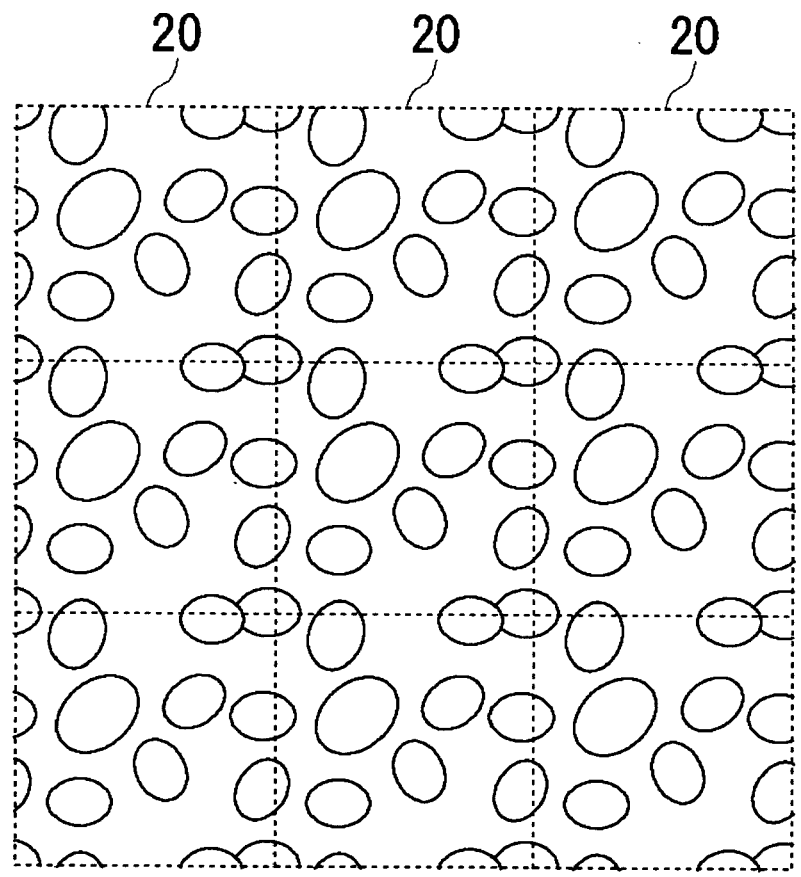
FIG. 2 is a diagram showing a state where the texture shown in FIG. 1 is mapped onto a plane.

FIG. 2 shows a state where the texture 20 shown in FIG. 1 is tiled on a plane. As shown in FIG. 2, a continuous pattern appears across the texture boundaries. Hereinafter, a texture that shows a continuous pattern when thus mapped repeatedly will be referred to as a wrap round texture. Description will now be given of the method for creating this wrap round texture at high speed.

Figure 3:
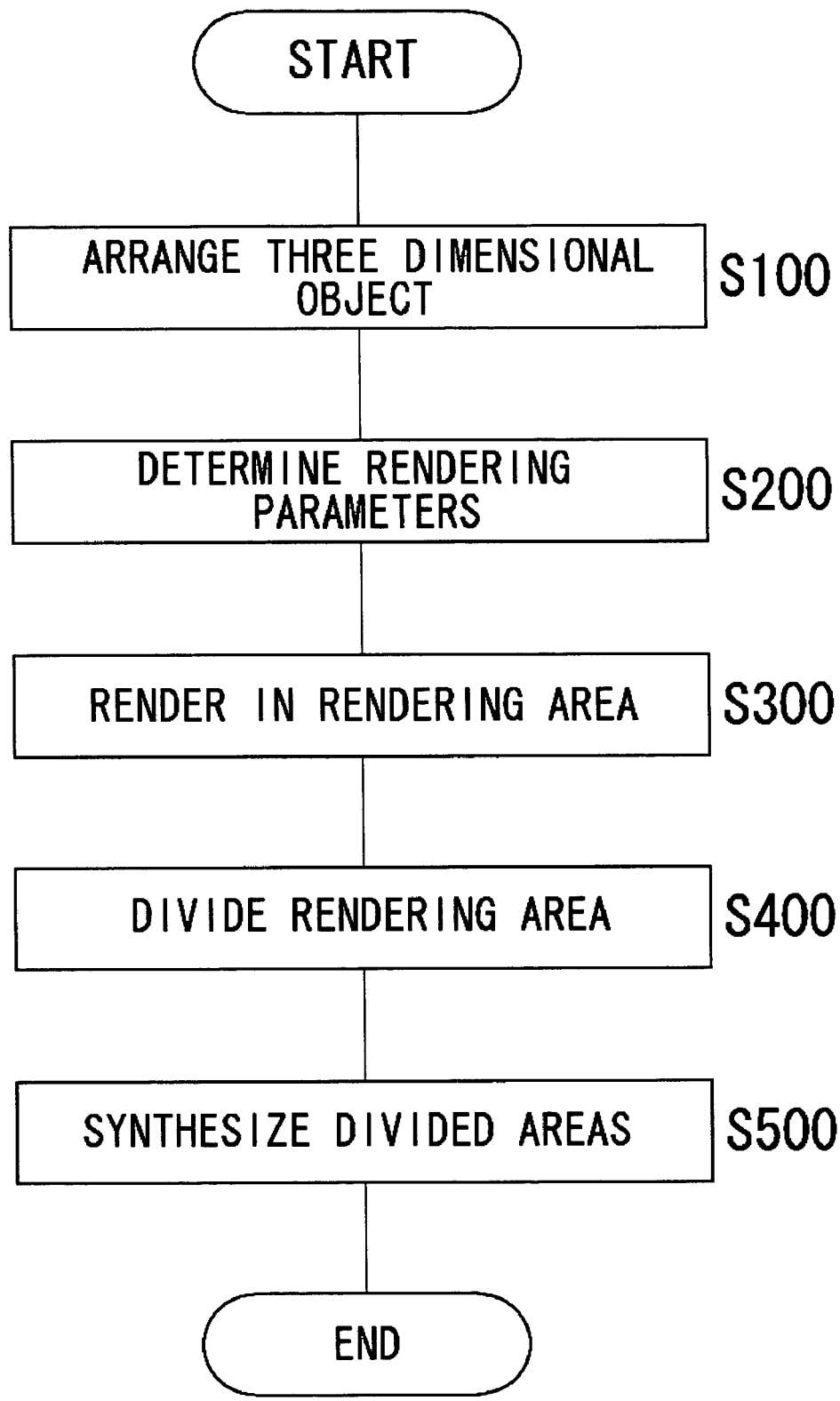
FIG. 3 is a flowchart showing a method of creating a wrap round texture.

FIG. 3 shows a flowchart of the method of creating a wrap round texture.

Initially, three-dimensional objects appropriate to express the physical texture of a matter, of which texture rendering is desired, are arranged (S100). For example, suppose the case of expressing pits and projections of rocks. Such three-dimensional objects as a cylinder and a spheroid, or previously-created objects or the like for representing some of the pits and projections of the rocks, are arranged and modeled in a predetermined space 100.

Figure 4:
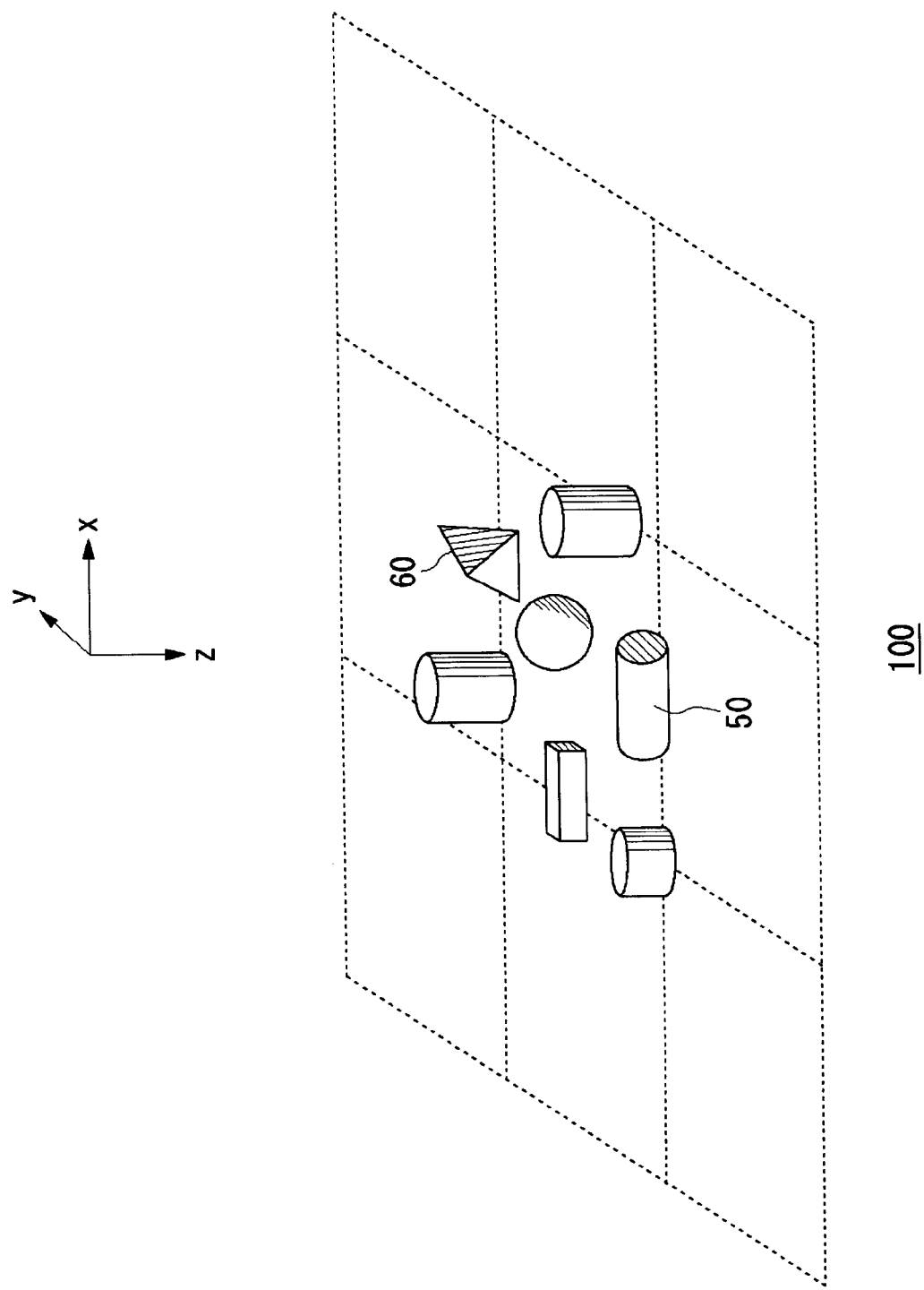
FIG. 4 is a diagram showing a state where three-dimensional objects are arranged in a predetermined space.

This texture may be a simple three-dimensional geometric pattern. In this case, three-dimensional objects for constituting a desired geometric pattern may be arranged. FIG. 4 shows a state where three-dimensional objects are arranged in the predetermined space 100. The objects arranged in the space include a cylindrical object 50 and a pyramidal object 60.

Next, rendering parameters such as a camera position, or the position of the viewpoint, a view direction, and a view volume are determined (S200).

Next, the three-dimensional objects are rendered in the rendering area with reference to information on a depth from the viewpoint by using a Z-buffer method or the like, for example (S300). The coordinate axis Z shown to the top in FIG. 4 indicates the view direction of the camera. The higher the Z coordinate is, the farther the distance from the viewpoint is. As employed herein, the "rendering area" refers to a memory area which is typically regarded as a frame buffer and a Z buffer. The phase "to render in the rendering area" means that the result of image processing is stored into the memory area, not displayed on an actual display screen.

When the three-dimensional objects are rendered in the rendering area with reference to the information on the depth from the viewpoint by using the Z-buffer method or the like, the distance from a plane including the viewpoint may be used as the Z value for indicating the depth from the viewpoint if the hidden surface elimination processing is performed based on parallel projection. If perspective projection is intended, either of the distance from the viewpoint and the distance from the plane including the viewpoint may be used as the Z value. In the texture creation method according to the present embodiment, a wrap round texture can be created regardless of which distance is used as the Z value.

Incidentally, with perspective projection, the viewpoint may vary between when rendered and when used. This can cause some distortion in the peripheral areas of the texture, whereas the created texture is sufficiently practical unless the viewing angle is too large or the intended shapes are too strict.

In the present embodiment, the color information on each individual pixel, or the RGB values, is written to the frame buffer. The information on the depth from the viewpoint, or the Z value, is written to the Z buffer. That is, rendering a three-dimensional object in the rendering area may be considered synonymous with performing view conversion and hidden surface (hidden line) elimination processing to convert the virtual three-dimensional model into a two-dimensional image.

Figure 5:
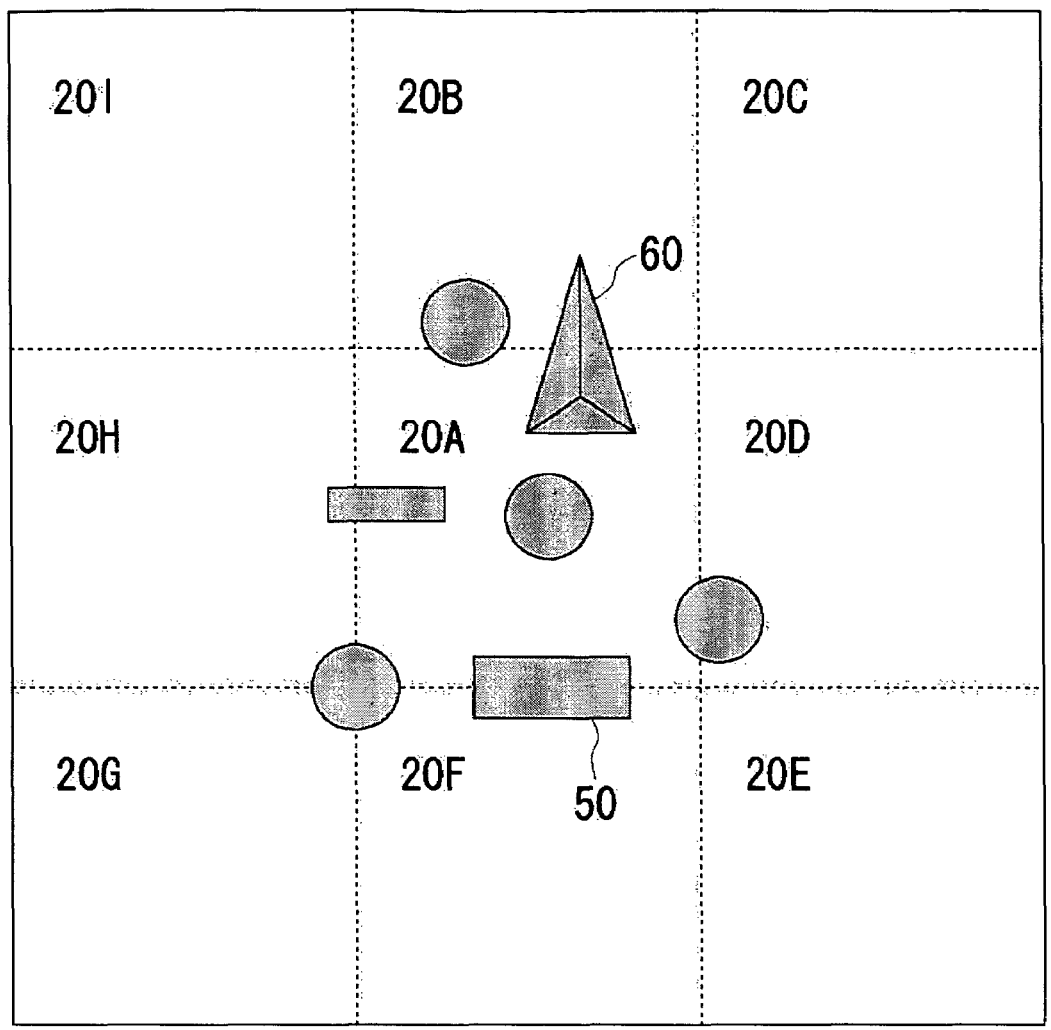
FIG. 5 is a diagram showing image data obtained by rendering the three-dimensional objects arranged in the space of FIG. 4 into a rendering area.

FIG. 5 shows image data obtained by rendering the three-dimensional objects arranged in the space of FIG. 4 into the rendering area 200. This rendering area 200 is divided by the broken lines into a 3×3 matrix of congruent areas 20A to 20I (S400). Among these congruent areas, the area 20A arranged at the center is assumed as a target area. The rendering data rendered in the areas 20B to 20I is then merged into this target area 20A successively (S500). Since the merged data written in this target area 20A is the final texture data, the size of the divided areas corresponds to the size of the intended texture.

Conversely, such factors as the size of the space for the three-dimensional objects to be arranged in and the position of the viewpoint are determined by the desired size of the texture.

As a result of division of the rendering area 200, the cylindrical object 50 of FIG. 4 is rendered across the target area 20A and the area 20F. The pyramidal object 60 is rendered across the target area 20A and the area 20B.

Figure 6:
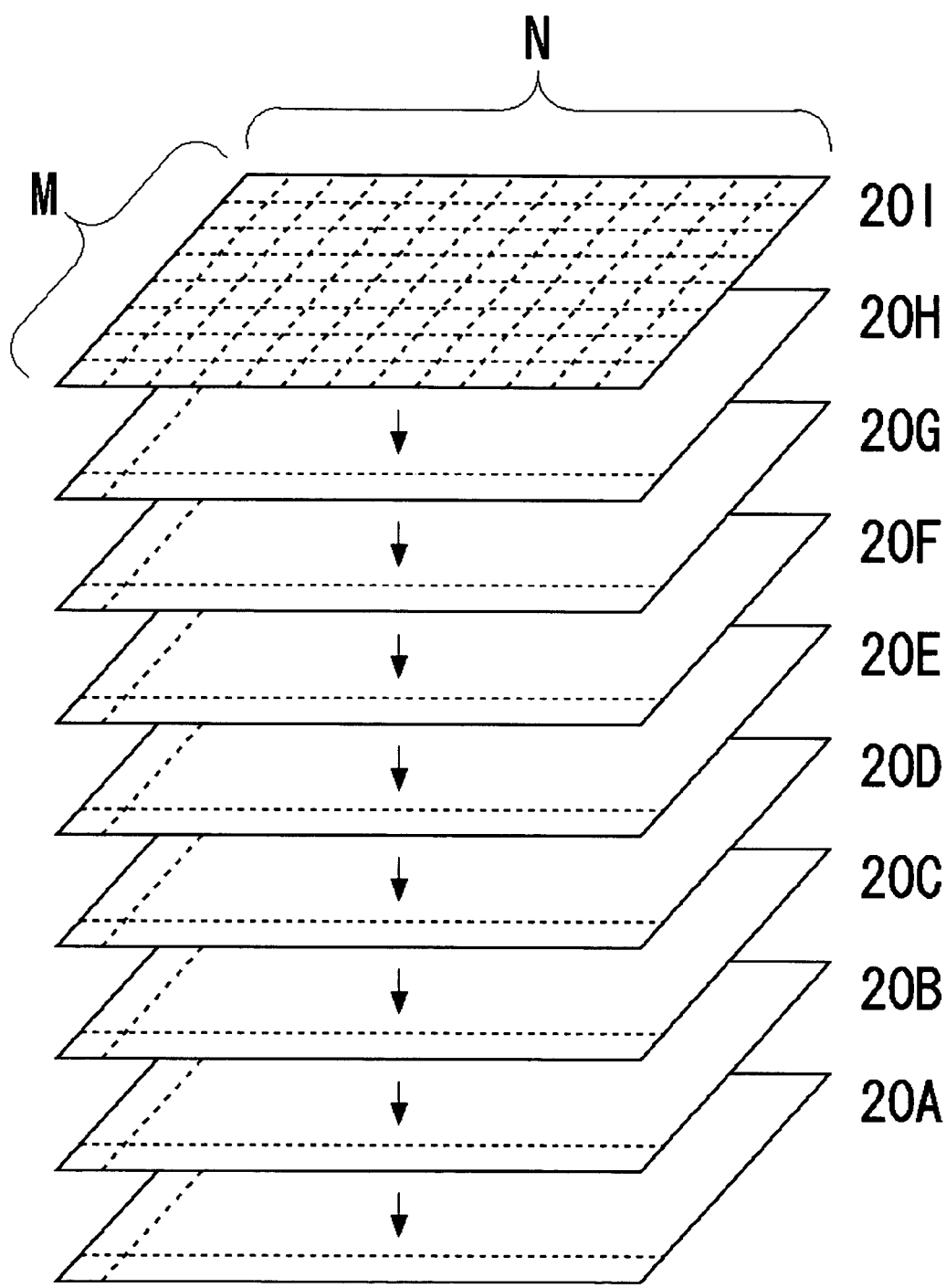
FIG. 6 is a diagram schematically showing how the areas are merged each other.

Next, description will be given of the merge of the areas. FIG. 6 schematically shows how the areas are merged with each other. The areas 20A to 20I are congruent, each consisting of M rows and N columns of pixels. In each of the areas, the pixel in the ith row and jth column shall have the following pieces of pixel data: color data consisting of RGB values, denoted as $C_{ij}$; and a Z value for indicating the depth information, denoted as $Z_{ij}$. Moreover, for the sake of area-to-area distinction in the pixel data, the color information $C_{ij}$ of the area 20A shall be denoted as $C_{ij}(A)$ and that of the area 20B as $C_{ij}(B)$, for example.

The merger of the areas is achieved by comparing to update the pixel data between the corresponding pixels, or ones having the same values of i and j, in different areas under the following condition.

When an area 20α and an area 20β are merged into a new area 20γ, the Z values of the respective pixels in the ith row and jth column are compared with each other by referring to the Z buffers of the respective areas. If the result of comparison shows that $Z_{ij}(\alpha) > Z_{ij}(\beta)$, it means that the pixel data rendered in the area 20β is part of an object that lies closer to the viewpoint. For the merged new area 20γ, the color information $C_{ij}(\gamma)$ in the ith row and the jth column is thus updated with $C_{ij}(\beta)$, and $Z_{ij}(\gamma)$ with $Z_{ij}(\beta)$. On the other hand, if $Z_{ij}(\alpha) < Z_{ij}(\beta)$, it means that the pixel data rendered in the area 20α is part of an object that is closer to the viewpoint. For the merged new area 20γ, the color information $C_{ij}(\gamma)$ in the ith row and the jth column is thus updated with $C_{ij}(\alpha)$, and $Z_{ij}(\gamma)$ with $Z_{ij}(\alpha)$.

This processing is performed on each of the pixels from the 1st row and 1st column to the Mth row and Nth column, thereby completing the merger of the areas 20α and 20β. In the area 20γ obtained thus, objects closer to the viewpoint, or objects having smaller Z values, are overwritten in order.

Figure 7:
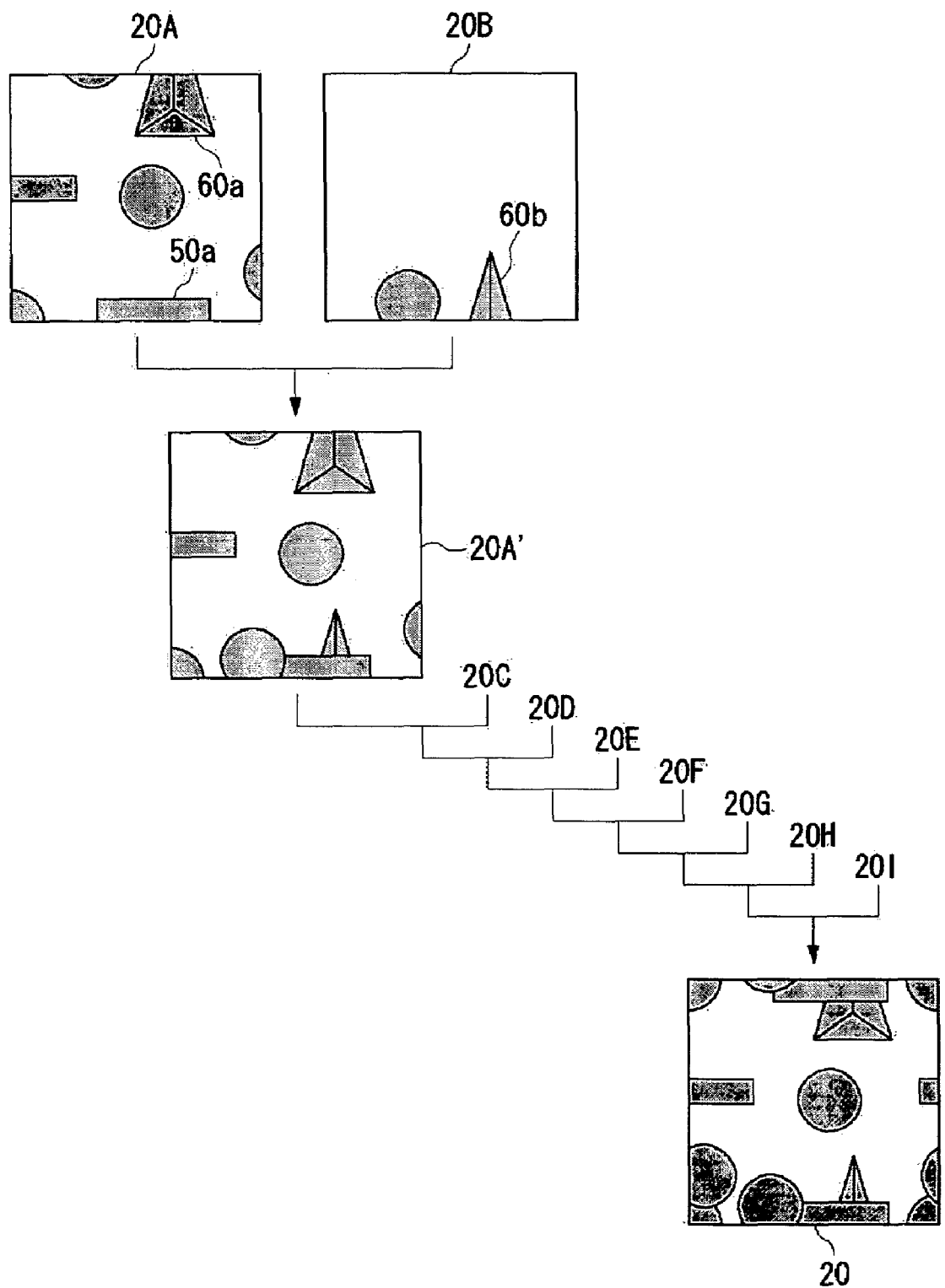
FIG. 7 is a diagram showing how a target area 20A is merged with areas 20B to 20I.

The foregoing merging method will be described with reference to the drawings. FIG. 7 shows how the target area 20A is merged with the areas 20B to 20I.

In the area-to-area merger according to the present embodiment, the target area 20A and the area 20B are initially merged into new data, or a new target area 20A'. The new target area 20A' obtained thus and the area 20C are merged into a target area 20A". In this way, the areas 20B to 20I are successively merged with the target area 20A obtained in turn, whereby all the areas can be merged. Here, the areas need not necessarily be merged into the target area in succession. An additional memory area may be provided so that merged data is stored into this area to create the intended texture data.

The cylindrical object 50 is rendered as an object 50a in the target area. The pyramidal object 60 is rendered as an object 60a in the target area, and as an object 60b in the area 20B. The cylindrical object 50 has a height greater than that of the pyramidal object 60, and thus is closer to the viewpoint. Consequently, the pixels of the object 50a rendered in the target area 20A have Z values higher than those of the pixels of the object 60b rendered in the area 20B. As a result of merging the target area 20A with the area 20B, the pixel data of the object 50a remains where the pixels of the objects 50a and 60b overlap. In this way, the Z values of all the pixels are compared to update the pixel data, whereby the new target area shown as 20A' in FIG. 7 is obtained.

The target area 20A' obtained thus and the other areas 20C to 20I are then merged in succession. Eventually, the texture data 20 into which all the areas are merged is created in the target area 20A.

Incidentally, during this merger, areas having no three-dimensional object need not be subjected to the merging processing. For example, among the areas shown in FIG. 4, the areas 20I, 20C, and 20E have no object. These areas may be omitted from the merging processing. Conversely, since the no-object pixels have higher Z values or are farther from the viewpoint, they can also be merged without any particular problem.

Moreover, the areas may be merged in any order since the order of merging process has no effect on the texture data to be created. That is, the concept of the target area is used for the sake of convenience. In some cases, any one of the areas 20A to 20I may be defined as the target area.

Figure 8:
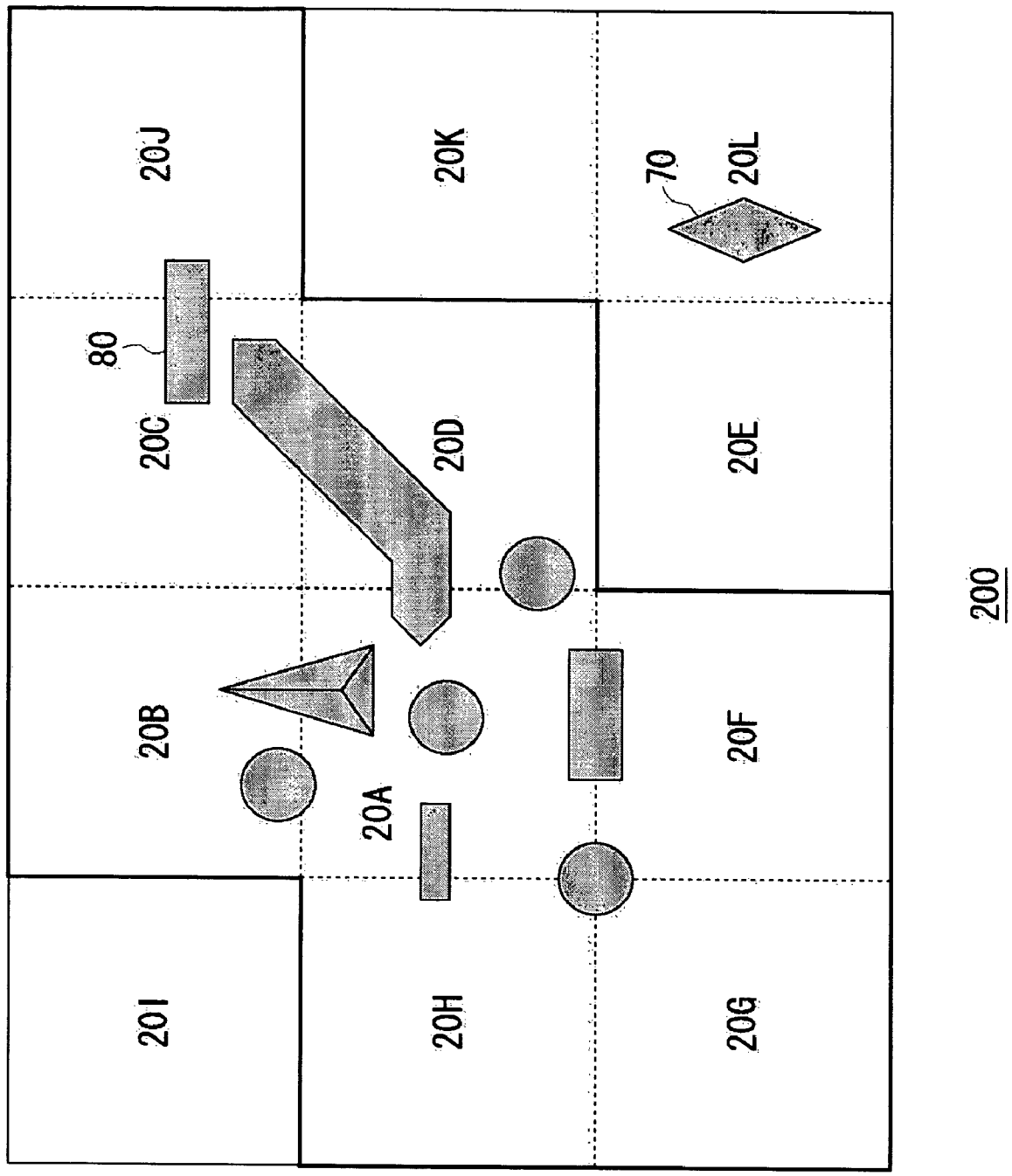
FIG. 8 is a diagram for explaining a method of determining which areas to merge.

The area merging process may also be performed in the following manner. FIG. 8 shows image data obtained by rendering three-dimensional objects arranged in a space into the rendering area 200. Initially, a target area 20A having the size of the intended texture is defined in this rendering area 200.

Next, the periphery around this target area 20A is divided into areas 20B to 20L. Of these areas 20B to 20L, the areas 20B, 20C, 20D, 20F, 20G, and 20H must be merged since they contain objects that are included in the target area 20A. The areas 20I, 20K, and 20L have no object and thus need not be merged. The area 20L has no object that is included in the target area 20A but an object 70 that is included in this area alone. Such areas need not be merged, either.

Now, the area 20J will be examined. The area 20J shares an object 80 with the area 20C. Since the area 20C is one of the areas to be merged, the object 80 will be discontinuous and fail to wrap around if the area 20J is not merged. Consequently, this area 20J must also be merged.

In summary, whether or not to merge is initially determined of the areas adjoining around the target area 20A. Then, among the areas that adjoin the areas to be merged, ones that share any object with the areas determined to be merged so far are also determined to be merged. As above, the areas to be merged are determined in succession, and whether or not to merge the areas adjoining those areas are then determined in order. All the necessary areas can thus be merged to create a wrap round texture.

Figure 9:
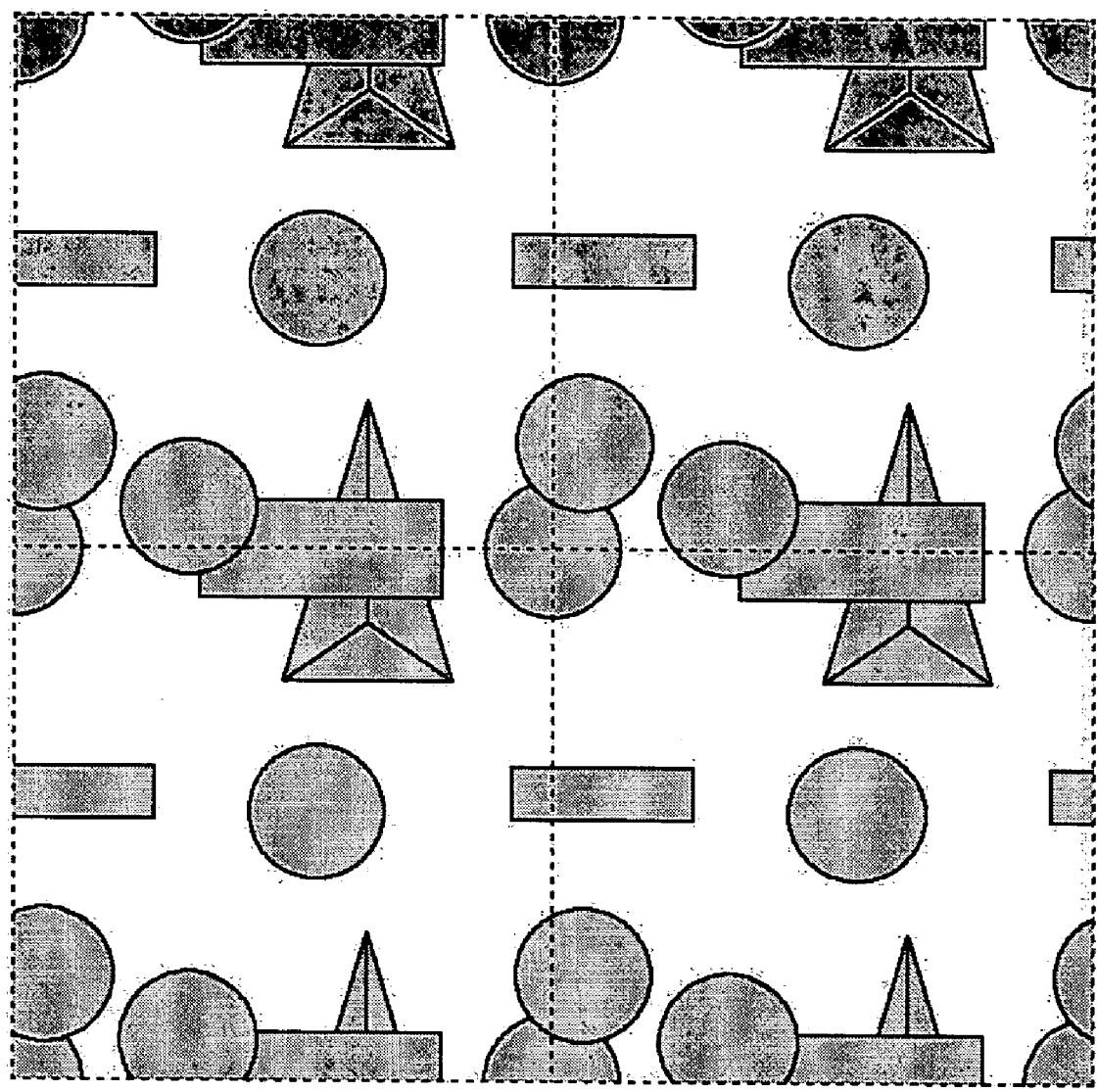
FIG. 9 is a diagram showing a state where texture data obtained by the texture creation method according to the present embodiment is mapped in tiles repeatedly.

Among the bounding sides of the texture created as described above, mutually opposite sides have pixels of the same Z values. Thus, when the texture is arranged repeatedly, adjoining ones of the textures coincide in the Z values on the boundary therebetween. FIG. 9 shows the state where the texture data 20 obtained by the texture creation method according to the present embodiment is mapped in tiles repeatedly. From FIG. 9, it can be seen that the texture data 20 constitutes a wrap round texture for showing a continuous pattern repeatedly. According to the foregoing method, such a texture can be created at high speed through arithmetic processing in accordance with the procedure shown in FIG. 3. In a game program and the like, it is therefore possible to create various textures while changing the position of the viewpoint in real time.

For example, even in situations where prepared textures are not available, such as when a username is entered and used for a texture in a game, it is possible to create a texture capable of wrap-round by the foregoing method. The advantage of real-time texture creation can also be enjoyed when combinations of positions, directions, sizes, lighting modes, objects to be rendered, and the like are so many that it is impractical to prepare textures for all the possible combination.

The real-time texture creation is also required if user-designed textures are used in a game. The texture creation method according to the present embodiment may also be used in such cases.

Moreover, a texture created by moving objects arranged in the space in real time can be used as a moving wrap round texture. This technique can be used, for example, to express clouds hanging in the sky in three-dimensional graphics animation.

Such a wrap round texture may be mapped in tiles on a two-dimensional plane, for example. In this case, only the color information consisting of the RGB values will be referred to out of the texture data.

This wrap round texture can also be mapped to the surface of a three-dimensional object by referring to the RGB values alone. For example, the texture can be mapped all around a three-dimensional object to show a seamless, continuous pattern.

Furthermore, this wrap round texture can be used not only as a two-dimensional plane texture as described above, but also as a three-dimensional texture having Z values or depth information. More specifically, in the process of creating the texture, the depth information $Zij(A)$ of the target area resulting from the area merging may be stored along with the color information $Cij(A)$. This depth information is then converted into information on height from a plane for the texture to be pasted to. This makes it possible to paste the texture to the surface of such a matter as a polygon in three-dimensional computer graphics and use the height information of the texture for various expressions. Such texture data can be used as a seamless, continuous displacement map.

Moreover, a normal vector buffer for storing normal vector data pixel by pixel may be provided instead of the frame buffer, or in addition to the frame buffer, so that a normal vector map is generated in the process of creating a texture. More specifically, three-dimensional objects are rendered in the rendering area 200, and the rendering area is divided and then merged into a target area. Based on the depth information $Zij(A)$ of the target area, the directions of the normal vectors to the respective pixels in the target area are calculated. The resultants are then written to the normal vector buffer to obtain a normal vector texture. Incidentally, the directions of the normal vectors can be calculated by algorithms well known to and techniques commonly used by those skilled in the art. Description thereof will thus be omitted here.

By using the foregoing method, it is possible to create a wrap-round normal vector map texture which provides normal vectors of continuous directions across boundaries when mapped continuously. Such a texture having normal vector data makes it possible to render a seamless continuous bump map, which can extend the range of three-dimensional graphics expression. Since this normal vector map texture can also be created in real time at high speed, the bump map can be changed with time to present such expression that pits and projections on the surface of a matter displayed onscreen vary with time.

While the texture created as described above is a virtual creation on a computer, a unit sheet of actual wallpaper, tiling, and the like created from the texture are also applicable as an embodiment of the present invention.

For example, to create a flat sheet having no asperity, the electric data on the texture created by the foregoing method can be printed on a sheet material to form a unit sheet which can be actually pasted repeatedly.

For three-dimensional unit sheets, a piece of wallpaper or tiling having an uneven surface is feasible. Take, for example, the case of forming a unit sheet of tiling having a floral pattern, or an embossed floral pattern. Here, a mold can be formed by using CAD based on the electric data on a three-dimensional texture created by the foregoing method, so that identical tiles are formed with the mold.

The foregoing embodiments have been given solely by way of illustration. It will be understood by those skilled in the art that various modifications may be made to combinations of the foregoing components and processes, and all such modifications are also intended to fall within the scope of the present invention.

The foregoing description has dealt with the cases where the rendering area 200 is square or rectangular in shape, and the divided target area or the final texture data is of square or rectangular shape as well. Nevertheless, the shapes of the areas are subject to a number of variations.

FIGS. 10A to 10D show some variations of the rendering area 200 and the divided areas. As in FIG. 10A, the rendering area 200 may be shaped as a parallelogram instead of the square or rectangle. In this case, the congruent areas 20A to 20I are also parallelograms.

Figure 10A:
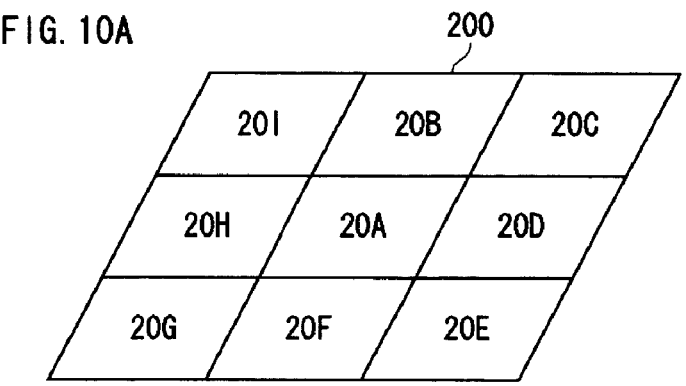
FIGS. 10A to 10D are diagrams showing modifications of the rendering area and the resulting divided areas.
Figure 10B:
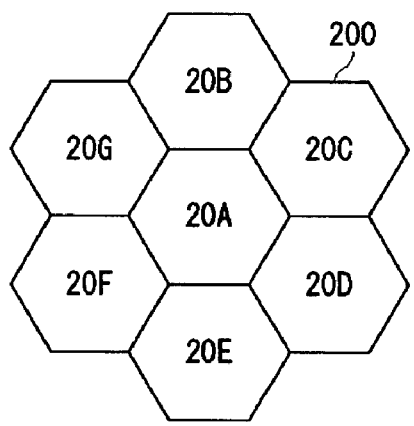

In FIG. 10B, a regular hexagonal rendering area 200 is divided into congruent, regular hexagonal areas 20A to 20G. The regular hexagonal texture provides the effect of making border areas less visible when mapped in tiles.

Figure 10C:
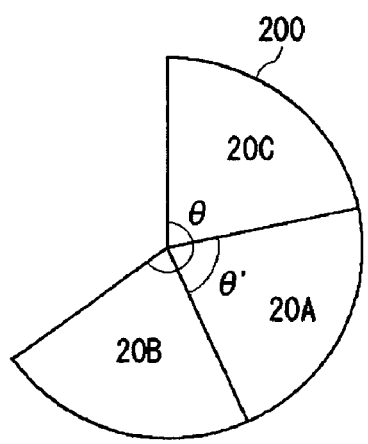

In FIG. 10C, a sector-shaped rendering area 200 having a center angle of θ is divided into three congruent sectors having a center angle of θ'. With the area 20A as the target area, the areas 20A to 20C can be merged to create a wrap round texture which shows a continuous pattern when pasted to a circle on a plane. The sector-shaped texture can also be mapped onto the side of a cone. In this case, the center angle of the sector of the rendering area is adjusted in accordance with the shape of the cone to be mapped.

Figure 10D:
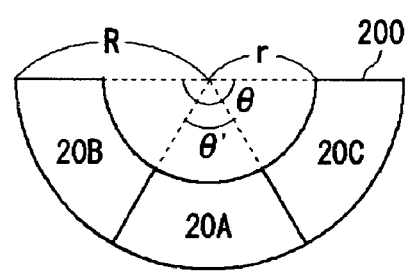

In FIG. 10D, a rendering area 200 which is obtained by cutting off a sector of r in radius from a sector of R in radius is divided into congruent shapes. In this case, the texture can be mapped onto the side of a truncated cone continuously. Again, in the rendering area of FIG. 10D, the center angles θ and θ' and the radii R and r are adjusted in accordance with the shape of the truncated cone to be mapped.

While the objects rendered in the rendering area 200 of FIG. 5 are arranged so as to lie across two areas each, larger objects may be arranged across three or more areas. Even in this case, a wrap round texture can be created by merging all the areas.

The rendering area may be divided vertically or horizontally, in one direction alone. In this case, the wrap round texture created shows a continuous pattern occurring in the divided direction.

Objects that are included only in areas other than the target area 20A contribute to an unnecessarily broader rendering area since they are merged and overwritten to the target area 20A eventually. For example, if there is a sphere that is included only in the area 20I of FIG. 4, the sphere should have been disposed to the corresponding position in the target area 20A in the first place. In other words, the processing is redundant. For the sake of simpler processing, three-dimensional objects may be arranged so that each individual object is always included in the target area 20A at least in part.

Before three-dimensional objects are arranged and rendered into the rendering area 200, the frame buffer may be filled with a desired background color along with a Z value for infinite distance. A texture created in advance may also used as the background.

What is claimed is:

1. A texture creation method performed by a computer comprising:
   arranging one or more three-dimensional texture objects in a space, and rendering the three-dimensional texture objects into a two-dimensional texture rendering area through hidden surface elimination processing performed by the computer while maintaining the depth of the three-dimensional texture objects from a fixed viewpoint with reference to the Z values thereof;
   dividing, by the computer, the two-dimensional texture rendering area in which the three-dimensional texture objects are rendered into a matrix with a plurality of mutually congruent texture tiles; and
   merging, by the computer, each texture tile into a predetermined target texture tile, wherein
   at the time of merging each texture tile into the predetermined target texture tile, the pixel data and Z values are updated based on the result of the comparison between the Z values of the overlapping pixels of the texture tiles, whereby the texture tiles are merged to create the intended texture data.

2. The texture creation method according to claim 1, wherein each of the three-dimensional texture objects is arranged in the space so at least some part of each is included in the predetermined target texture tile among the texture tiles.

3. The texture creation method according to claim 1, further comprising rendering, before merging the texture tiles into the predetermined target texture tile, a background texture on the predetermined target texture tile by using a Z value farther than the three-dimensional texture objects as measured from the fixed viewpoint.

4. The texture creation method according to claim 1, further comprising converting the Z value of each pixel of the intended texture data into information on height from a predetermined reference plane perpendicular to a view direction in the space where the three-dimensional texture objects are arranged, and storing the resultant as inherent height information.

5. The texture creation method according to claim 1, further comprising calculating a direction of a normal vector with respect to each pixel of the intended texture data, and storing the resultant as normal vector data.

6. The texture creation method according to claim 1, wherein each of the mutually congruent texture tiles is of a size corresponding to the size of the intended texture data.

7. A texture creation method performed by a computer comprising:
   arranging one or more three-dimensional texture objects in a space, and rendering the three-dimensional texture objects into a two-dimensional texture rendering area through hidden surface elimination processing performed by the computer;
   dividing, by the computer, the two-dimensional texture rendering area in which the three-dimensional texture objects are rendered into a matrix with a plurality of mutually congruent texture tiles;
   selecting, by the computer, the texture tiles to be merged from among all the texture tiles so that none of the rendered three-dimensional texture objects intersect the boundary between a texture tile to be merged and a texture tile not intended to be merged; and
   merging, by the computer, the texture tiles to be merged into one of the texture tiles to be merged, wherein
   at the time of merging the texture tiles to be merged into one of the texture tiles to be merged, pixel data is updated based on the distance from a fixed viewpoint used in the hidden surface elimination processing, whereby the texture tiles to be merged are merged to create the intended texture data.

8. The texture creation method according to claim 7, further comprising calculating a direction of a normal vector with respect to each pixel of the intended texture data, and storing the resultant as normal vector data.

9. The texture creation method according to claim 7, wherein each of the mutually congruent texture tiles is of a size corresponding to the size of the intended texture data.

* * * * *